United States Patent Office 3,491,141
Patented Jan. 20, 1970

3,491,141
N-FLUOROCARBAMATES AND PREPARATION THEREOF
Vytautas Grakauskas, Arcadia, Calif., assignor to Aerojet-General Corporation, Azusa, Calif., a corporation of Ohio
No Drawing. Filed Oct. 14, 1964, Ser. No. 404,207
Int. Cl. C07c *125/06*
U.S. Cl. 260—468      13 Claims This invention pertains to novel fluorine-containing compounds and to their method of preparation.

Generally, in the prior art, the use of elemental fluorine as a fluorinating agent in organic synthesis has been avoided since reactions involving direct fluorination have been found to be very vigorous. Normally, fluorination reactions are highly exothermic and the heat of reaction is sufficient to berak the carbon-to-carbon linkages in the organic compounds being treated. For this reason, heretofore the yields of organic compounds of the same carbon skeletal arrangement as the starting material have been low.

It has now been found that organic N-fluorocarbamates and difluoramines may be obtained in good yield and purity by direct fluorination. The drawbacks noted in the prior art regarding direct fluorination are surprisingly absent from the present invention.

It is an object of this invention to prepare novel classes of N-fluorocarbamates and organic difluoramine compounds. It is another object of this invention to prepare these compounds by direct fluorination in a novel manner. These and other objects of this invention will be apparent from the detailed description which follows.

The novel fluorine-containing compounds of this invention have the following general formula:

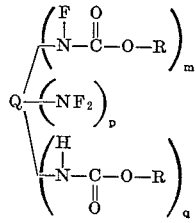

wherein Q is a monovalent or polyvalent organic radical, R is a monovalent hydrocarbyl radical (i.e., alkyl, aryl, aralkyl and alkaryl), and $m$, $p$ and $q$ each have a value of from 0 to about 5, with the proviso that when $m$ is 0, $p$ is at least 1, and when $p$ is 0, $m$ is at least 1, and with the further proviso that no single carbon atom in the Q radical carries more than one —$NF_2$ substituent. The valency of Q is normally equal to $m+p+q$. Preferred Q groups include monovalent organic radicals such as alkyl, cycloalkyl, nitroaryl, nitroalkyl, haloaryl, and haloalkyl. Preferred divalent Q groups include alkylene, arylene, haloarylene, haloalkylene, nitroarylene, nitroalkylene, and nitraza-interrupted alkylene. In the above formula, R and Q are each preferably lower members of the series and contain from 1 to about 10 carbon atoms.

The compounds of the above formula are prepared in accordance with the following general reaction equation

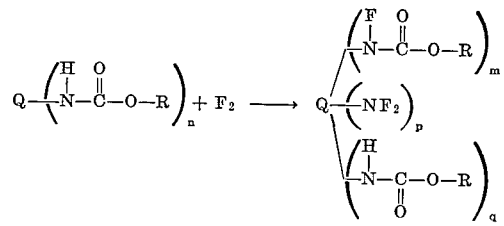

wherein Q, R, $m$, $p$ and $q$ are as defined above, and $n$ is numerically equal to $m+p+q$. This reaction also yields various by-products such as carbon dioxide and alcohols, depending on the nature of the product desired.

The temperature at which these fluorination reactions are carried out is not critical. Normally it is desirable to keep the temperature as low as possible when working with fluorine, and thus the preferred reaction temperature is between about —40° C. and about +40° C. More preferably the reaction is carried out between the temperature of about —5° C. and +5° C.

The fluorine gas used may be diluted with an inert gas such as helium or nitrogen so as to improve the control of the rate of fluorine addition.

The fluorinations of this invention may be carried out in any conventional reactor. However, for long reactor life, those portions of the reactor which come in contact with fluorine should be coated with material such as nickel or polyethylene.

The carbamate compounds of this invention may be isolated in conventional manner, i.e., by filtration, crystallization, extraction and/or distillation.

The fluorination reaction of this invention is preferably, although not necessarily, carried out in a substantially inert moderator. The term "substantially inert" as used throughout the specification and claims is intended to include any moderator which is less reactive with fluorine than the carbamate compound being fluorinated.

The most suitable substantially inert moderators are those less than one quarter as reactive with fluorine as the carbamate compounds. One preferred class of moderators for this invention are those polar or non-polar materials in which the carbamate compound being fluorinated is at least partially soluble. Thus, the moderator may be a complete solvent for the material being fluorinated. Likewise, the moderator may be a material in which the carbamate compound forms only a partial suspension. Preferably, although not necessarily, the carbamate compound is soluble in the moderator at least to the extent of 1 part by weight per 100 parts of the moderator. The moderator serves not only as a carrier for the reaction but also aids in controlling the fluorination of the carbamate compound.

I am not certain as to the exact mechanism by which the moderators assist in controlling the fluorination. In any event, the moderator promotes selective fluorination i.e., the fluorination will occur only at the most reactive site in the carbamate compound.

The specific moderator chosen is not critical and its selection depends upon such factors as cost, availability, inertness and solvent characteristics.

The preferred moderators are those polar and non-polar materials which are liquid within a temperature range of about —40° C. to about +40° C. This does not mean that the moderator must be liquid throughout this entire range. Rather, the preferred moderators are liquid over at least some portion of this range, that is, they have a normal melting point either below or within this range.

One class of modifiers that have been found to be particularly useful in the controlled fluorination of carbamates are the aliphatic nitriles such as acetonitrile, propionitrile, butyronitrile and the like.

Typical of other suitable moderators for use in the practice of this invention are the hydrocarbon alkanes and especially the hydrocarbon alkanes having from 5 to about 10 carbon atoms, such as pentane, hexane, octane, nonane and decane. Another group of suitable moderators are the haloalkanes having from 1 to about 8 carbon atoms, such as methylene dichloride, ethylene chloride, chloroform and carbon tetrachloride. Still another class of moderators are the aromatic hydrocarbons having from 6 to about 12 carbon atoms, such as benzene, toluene and the ortho, meta and para isomers of xylene. The chlorinated aromatic hydrocarbons containing 6 to 12 carbon atoms may also be used. Illustrative of these are monochlorobenzene and chlorotoluene.

Other suitable moderators include the aliphatic ketones, having the formula:

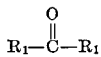

and ethers having the formula:

$$R_1-O-R_1$$

and the dialkyl substituted amides having the formula:

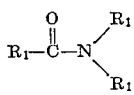

wherein in the above formulae the $R_1$ groups are alkyl, and preferably lower alkyl having from 1 to about 10 carbon atoms, such as methyl, ethyl, pentyl and octyl. Specific ketones include dimethyl ketone, diethyl ketone and methyl, ethyl ketone. The ethers include dimethyl ether, diethyl ether and diisopropyl ether. The substituted amides include dimethyl formamide, diethyl formamide and dimethyl acetamide.

Still other moderators are water, the lower alkanols having from 1 to about 10 carbon atoms and the lower alkylene glycols having from 1 to about 10 carbon atoms. Suitable lower alkanols and alkylene glycols include methanol, ethanol, isopropanol, ethylene glycol, propylene glycol and butylene glycol.

It is to be understood that mixtures of any of the foregoing moderators may be employed in the practice of this invention. Acetonitrile is the preferred moderator because of effectiveness, low cost and ready availability. However, water and the lower aliphatic alcohols such as methanol, ethanol, and isopropanol also have been found to give very good results. It is surprising that the fluorination reaction can be carried out in lower aliphatic alcohols since the introduction of fluorine into the lower aliphatic alcohol would normally be expected to cause fires and explosions. Fluorination reactions of this invention were found to proceed very satisfactorily in the lower aliphatic alcohols.

The amount of the moderator employed is not critical. Normally the weight ratio of moderator to the carbamate compound being fluorinated is within the ratio from about 0.5 to about 200, and more preferably within the range from about 1.0 to about 20.

In the fluorinations of this invention the proportions of the reactants are not critical. In general if the starting material is a monocarbamate of the formula:

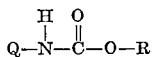

the reaction of one mole of fluorine will favor the production of N-fluorocarbamates of the formula:

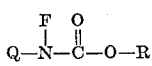

However, if two moles of fluorine are added per mole of starting material, the product will be, in predominant amount, an organic difluoramino compound of the formula:

$$Q-NF_2$$

If the starting material contains more than one carbamate group, then the mole ratio of carbamate to fluorine may be varied to alter the nature of the predominant product. For example, if a mole of a dicarbamate of the formula:

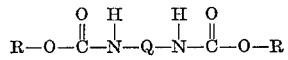

is reacted with one mole of fluorine, the production of:

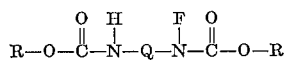

is favored. If the amount of fluorine added is doubled, the product tends to be:

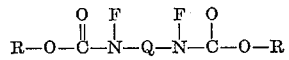

or

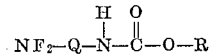

If the amount of fluorine is doubled again, the production of the difluoramino compounds having the formula $NF_2-Q-NF_2$ is maximized. Normally the organic carbamate compound and fluorine should be used in approximately stoichiometrically equivalent amounts based on the type of product desired, since the use of excessive fluorine may cause extensive reaction with the moderator resulting in undesirable contamination of the desired product.

Fluorination reactions in this invention may be carried out under any suitable pressure. Normally atmospheric pressure is used since it is most convenient. However, it may be sometimes desirable to conduct the fluorination under elevated pressure in order to increase the solubility of the fluorine in the moderator.

The carbamate starting materials of this invention may be prepared in any one of several ways already known to those skilled in the art. For example, the carbamate starting materials can be obtained by reacting a primary amine with an organic chloroformate in the presence of a base as shown in the following equation:

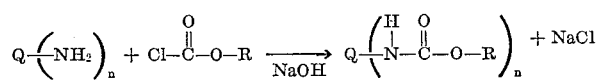

wherein Q, R and $n$ are as defined above.

Alternatively, the carbamates may be obtained by reaction of a diisocyanate with an alcohol as follows:

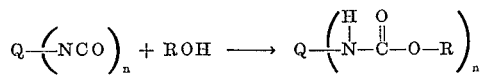

The examples which follow are presented only for purposes of illustration and should not be regarded as limitative of the scope of our invention in any way. In the examples, percentages are by weight and gas volumes are at standard temperature and pressure unless otherwise indicated.

EXAMPLE I

Preparation of ethyl N-fluoro-N-methylcarbamate

A solution of 26 grams ethyl N-methylcarbamate (0.25 mole) in 350 ml. water was fluorinated with elementary fluorine diluted with nitrogen (1:4) at 0 to 5° C. until ca. 11 liters of fluorine gas was passed into the reaction mixture. At the end of the run the reaction mixture was extracted with ten 25-ml. portions of methylene chloride and the combined extracts were dried over Drierite. The filtered solution was concentrated and the residue fractionated to give 3.0 grams of liquid, B.P. 50° C./10 mm., $n_D^{25}$ 1.3869, which was identified as ethyl N-fluoro-N-methylcarbamate.

*Analysis.*—Calc'd for $C_4H_8FNO_2$: C, 39.67; H, 6.66; N, 11.57; F, 15.69. Found: C, 39.10; H, 6.62; N, 11.97; F, 15.20.

EXAMPLE I-A

Fluorination of methyl N-n-butylcarbamate

Methyl N-n-butylcarbamate, 131 grams (1.0 mole) was fluorinated at 0 to 5° C. with elementary fluorine (diluted with nitrogen; 1:4) until one mole of fluorine was consumed (3.0 hours). The reaction mixture was treated with 200 ml. of ice water and phases separated. The organic phase was washed with 200 ml. of cold water, dried, and fractionated to give 10.6 grams (17 percent yield) of N,N-difluoro-n-butylamine, B.P. 74° C. and 13.5 grams (20 percent yield) of methyl N-fluoro-N-n-butylcarbamate, B.P. 68 to 69° C./25 mm., $n_D^{25}$ 1.4010. Further fractionation of the distillation residue yielded 34 grams (52 percent recovery) of starting material.

Both N–F compounds were identified on the basis of their elemental analysis, their infrared spectra, and their proton and fluorine NMR spectra.

Analysis.—n-$C_4H_9NF_2$: Calc'd for $C_4H_9NF_2$: C, 44.0; H, 8.3; N, 12.8; F, 34.8. Found: C, 44.3; H, 8.2; N, 12.8; F, 35.0. n-$C_4H_9NFCO_2CH_3$: Calc'd for $C_6H_{12}NFO_2$: C, 48.3; H, 8.1; N, 9.4; F, 12.7. Found: C, 48.4; H, 8.5; N, 9.4; F, 12.3.

EXAMPLE II

Preparation of ethyl N-fluoro-N-octylcarbamate

A solution of 26 grams ethyl N-octylcarbamate (0.25 mole) in 350 ml. water is fluorinated with elementary fluorine diluted with nitrogen (1:4) at 0 to 5° C. until ca. 11 liters of fluorine gas is passed into the reaction mixture. At the end of the run the reaction mixture is extracted with ten 25-ml. portions of methylene chloride and the combined extracts are dried over Drierite. The filtered solution is concentrated and the residue fractionated to give 3.0 grams of liquid which is identified as ethyl-N-fluoro-N-octylcarbamate.

EXAMPLE III

Preparation of butyl N-fluoro-N-methylcarbamate

A solution of 26 grams butyl N-methylcarbamate (0.25 mole) in 350 ml. water is fluorinated with elementary fluorine diluted with nitrogen (1:4) at 0 to 5° C. until ca. 11 liters of fluorine gas is passed into the reaction mixture. At the end of the run the reaction mixture is extracted with ten 25 ml. portions of methylene chloride and the combined extracts are dried over Drierite. The filtered solution is concentrated and the residue fractionated to give 3.0 grams of liquid which is identified as butyl-N-fluoro-N-methylcarbamate.

EXAMPLE IV

Preparation of methyl β-difluoramino propionate

A solution of 3.2 grams of methyl N-carbethoxy-N-fluoro-β-aminopropionate (0.0166 mole) in 200 ml. water was fluorinated at 0 to 5° C. with elementary fluorine (diluted fourfold with nitrogen) until approximately 0.5 liter of fluorine gas was consumed. The aqueous solution was extracted with six 15-ml. portions of methylene chloride, and the combined extracts were dried, filtered, and concentrated. The residue was fractionated to give 0.7 gram of a colorless liquid, B.P. 97 to 98° C./20 mm., $n_D^{25}$ 1.3744, which was identified as methyl β-difluoroaminopropionate. The yield was 30 percent.

EXAMPLE V

Preparation of difluoraminocyclohexane and ethyl N-Cyclohexyl-N-fluorocarbamate A solution (partially in suspension) of 100 grams (0.585 mole) of ethyl cyclohexylcarbamate in 1200 ml. water was fluorinated with elementary fluorine (diluted with nitrogen, 1:4) at 5 to 10° C. until one mole of fluorine gas was consumed. At the end of the run the reaction mixture was extracted with five 75-ml. portions of methylene chloride. The combined methylene chloride extracts were dried, filtered and the filtrate concentrated to remove the solvent. The residual liquid was fractionated to give 35 grams of a colorless liquid, B.P. 36 to 42° C./25 mm., $n_D^{25}$ 1.4160. This material was analyzed by gas chromatography and was found to contain 85 to 90 percent of difluoraminocyclohexane. Further fractionation gave 7.0 grams of ethyl N-cyclohexyl-N-fluorocarbamate, B.P. 49 to 52° C./0.1 to 0.2 mm., $n_D^{25}$ 1.4437, and 30 grams of starting material.

EXAMPLE VI

Preparation of difluoraminocyclopentane and ethyl N-cyclopentyl-N-fluorocarbamate Ethyl cyclopentylcarbamate, 42.6 grams (0.3 mole), in 650 ml. water was fluorinated in the same manner as cyclohexylcarbamate. The aqueous reaction mixture was distilled at 30 C./25 mm. to remove bulk of difluoraminocyclopentane. The organic phase of the distillate was separated (aqueous phase returned back to the original aqueous mixture), dried with Drierite, filtered, and fractionated to give 4.5 grams of a colorless liquid, B.P. 24 to 30° C./25 mm., $n_D^{25}$ 1.3870. The material contained 80 to 85 percent of difluoraminocyclopentane. An analytical sample of the material was separated by gas chromatography.

Analysis.—Calc'd for $C_5H_9NF_2$: C, 49.58; H, 7.49; N, 11.56; F, 31.37. Found: C, 49.2; H, 7.8; N, 11.4; F, 31.0.

EXAMPLE VII

Preparation of ethyl β-difluoraminopropionate

A solution of 3.2 grams of ethyl N-carbethoxy-N-fluoro-β-aminopropionate (0.0166 mole) in 200 ml. water is fluorinated at 0 to 5° C. with elementary fluorine (diluted fourfold with nitrogen) until approximately 0.5 liter of fluorine gas is consumed. The aqueous solution is extracted with six 15-ml. portions of methylene chloride, and the combined extracts are dried, filtered, and concentrated. The residue is fractionated to give 0.7 gram of a colorless liquid which is identified as ethyl β-difluoraminopropionate.

EXAMPLE VIII

Preparation of difluoraminocyclohexane

A solution (partially in suspension) of 5.2 grams (0.03 mole) of ethyl N-cyclohexyl-N-fluorocarbamate in 200 ml. water was fluorinated at 0 to 5° C. with elementary fluorine (diluted with nitrogen; 1:4) until 0.7 liter (0.03 mole) of fluorine gas was consumed. At the end of the run the reaction mixture was extracted with three 20 ml. portions of methylene chloride. The combined extracts were dried with Drierite, filtered and the filtrate concentrated to remove the solvent. The residual liquid was fractionated to give 1.0 gram of a colorless liquid, B.P. 37° C./22 to 26 mm., $n_D^{25}$ 1.4146, and 2.8 grams of starting material, B.P. 51 to 52° C./0.1 mm. The low boiling liquid was identified as difluoraminocyclohexane.

EXAMPLE IX

Fluorination of diethyl ethylenedicarbamate

A solution (partially in suspension) of 82 grams (0.4 mole) of diethyl ethylenedicarbamate in 1400 ml. water was fluorinated at 0 to 5° C. with elementary fluorine (diluted with nitrogen, 1 to 4) until 30 liters of fluorine gas were consumed. At the end of the run, the reaction mixture was extracted with five 100-ml. portions of methylene chloride. The combined extracts were dried with Drierite, deacidified by the addition of 20 grams of sodium bicarbonate, filtered, and concentrated. The residual liquid was fractionated to give 10.5 grams of a material, B.P. 25 to 27° C./0.2 mm., $n_D^{25}$ 1.3955, identified as N-(2-difluoraminoethyl)-N-fluorocarbamate,

(percent fluorine: calc'd for 30.7; found 29.9).

Further distillation of the fluorination product gave 1 gram of a colorless liquid, B.P. 38 to 40° C./0.1 to 0.2 mm., $n_D^{25}$ 1.4125, which was identified as ethyl N-(2-difluoraminoethyl)carbamate $NF_2(CH_2)_2NHCOOC_2H_5$.

*Analysis.*—Calc'd for $C_5H_{10}F_2N_2O_3$: C, 35.71; H, 6.00; N, 16.66; F, 22.60. Found: C, 35.3; H, 5.84; N, 16.1; F, 22.3. The infrared spectrum is consistent with the structure.

After removal of the two low-boiling compounds, further distillation gave 10.3 grams of diethyl N,N'-difluoroethylenedicarbamate having the structure:

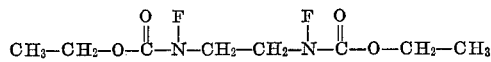

A semi-solid distillation residue, amounting to 25 grams and probably containing mainly the starting material, was not further investigated.

EXAMPLE X

Fluorination of diethyl trimethylenedicarbamate

A suspension of 34.7 grams (0.16 mole) of diethyl trimethylenedicarbamate in 650 ml. water was fluorinated at 0 to 5° C. with fluorine diluted with nitrogen (1 to 4) until 13.5 liters of fluorine gas was consumed. A —80° C. trap connected in series with the reactor remained empty during the course of the fluorination. At the end of the run, the reaction mixture was extracted with five 60-ml. portions of methylene chloride. The combined methylene chloride extracts were dried with Drierite, filtered, and the solution concentrated to remove the bulk of the solvent. Further distillation gave 1.5 grams of a colorless liquid, B.P. 15 to 50° C./0.2 to 0.5 mm.; a distillation residue, B.P. >50° C./0.2 mm. remained. The volatile liquid containing large amounts of the solvent was redistilled and, after removal of methylene chloride, 0.5 gram of liquid, B.P. 25 to 32° C. was isolated. This material analyzed by gas chromatography, was found to contain 70 to 75 percent of 1,3-bis(difluoramino)propane. An analytical sample of 1,3-bis(difluoramino)propane was isolated by gas chromatography.

*Analysis.*—Calc'd for $NF_2(CH_2)_3NF_2$, $C_3H_6F_4N_2$: C, 24.66; H, 4.14; N, 19.18; F, 52.02. Found: C, 25.1; H, 5.1; N, 18.9; F, 48.6. The infrared spectrum is consistent with the structure.

The proton NMR spectrum was obtained using carbon tetrachloride solution with TMS added as an internal reference. The triplet (splitting 28 cps.) of triplets centered on 3.64 p.p.m. is assigned to $NF_2\underline{CH_2}CH_2$—. The quintet at 2.18 p.p.m. is assigned to —$CH_2\underline{CH_2}CH_2$—.

The 56.4 mc. $F^{19}$ NMR spectrum was obtained using the same solution with Freon-11 added as an internal reference. The unresolved triplet at —3037 cps. (—53.9 p.p.m.) with an estimated splitting of 25 cps. is assigned to $N\underline{F_2}CH_2$—.

The proton and $F^{19}$ NMR spectra support the $NF_2(CH_2)_3NF_2$ structure.

The bulk of the fluorination product (18.5 grams) was fractionated further to give 5.0 grams of a colorless liquid, B.P. 43 to 45° C./0.2 mm., 2.5 grams of a liquid, B.P. 45 to 80° C./0.2 mm., and 4.5 grams of a colorless liquid, B.P. 95 to 105° C./0.2 mm. The dark solid distillation residue, amounting to five grams was discarded.

The 43 to 45° C. boiling material was redistilled and a middlecut, 4.0 grams, B.P. 42 to 43° C./0.2 mm., $n_D^{25}$ 1.3980 was taken for analyses.

*Analysis.*—Calc'd for $NF_2(CH_2)_3NFCOOC_2H_5$, $$C_6H_{11}F_3N_2O_2$$

C, 36.00; H, 5.54; N, 14.00; F, 28.48. Found: C, 35.6; H, 5.5; N, 13.8; F, 28.6. The infrared spectrum is consistent with the structure.

The 60-mc. proton NMR spectrum was obtained using a carbon tetrachloride solution with TMS added as an internal reference. The carbethoxy ethyl triplet and quartet appear at 1.34 p.p.m. and 4.28 p.p.m., the latter being overlapped by another signal (or signals). The quintet at 2.10 p.p.m. is assigned to the internal methylene group. The assignments for $NF_2\underline{CH_2}$— and —$\underline{CH_2}NF$— are somewhat tentative in view of the overlapping of signals. However, the following assignments are consistent with those for the other samples [$NF_2(CH_2)_3NHCOOC_2H_5$ and $CH_2(CH_2NFCOOC_2H_5)_2$] in this group and with the $F^{19}$ spectrum. A triplet (splitting of 29 cps.) of triplets centered on 3.61 p.p.m. is assigned to $NF_2\underline{CH_2}$—. A pair (splitting 36 cps.) of triplets centered on 3.80 p.p.m. is assigned to —$\underline{CH_2}NF$—.

The 56.4 mc. $F^{19}$ NMR spectrum was run on the same subject with Freon-11 added as an internal reference. The triplet (splitting 29 cps.) at —3090 cps. (—54.8 p.p.m.) is assigned to $N\underline{F_2}CH_2$—. It appears to be overlapped by another, weaker triplet (splitting 34 cps.) at +3919 cps. (+69.5 p.p.m.) is assigned to —$CH_2N\underline{F}$—.

The proton and $F^{19}$ NMR spectra are generally consistent with the structure $NF_2(CH_2)_3NFCOOC_2H_5$.

The material of the intermediate distillation cut, B.P. 43 to 80° C./0.2 mm., was redistilled to give 1.5 grams of a colorless liquid, B.P. 66 to 67° C./0.2 mm., $n_D^{25}$ 1.4195, which was identified as $NF_2(CH_2)_3NHCOOC_2H_5$ by comparing its infrared spectrum with that of a known sample, prepared from τ-difluoraminopropyl isocyanate.

The reaction product boiling at 95 to 105° C./0.2 mm. was redistilled, and a middle cut, 3.8 grams B.P. 95 to 96° C./0.2 mm., $n_D^{25}$ 1.4265, collected for analysis.

*Analysis.*—Calc'd for $CH_2(CH_2NFCOOC_2H_5)_2$, $$C_9H_{16}F_2N_2O_4$$

C, 42.52; H, 6.34; N, 11.02; F, 14.92. Found: C, 42.0; H, 6.1; N, 11.2; F, 16.0. The infrared spectrum is consistent with the structure.

The 60-mc. proton NMR spectrum was obtained using a carbon tetrachloride solution with TMS added as an internal reference. The assignments are as follows. The carbethoxy ethyl triplet and quartet appear at 1.34 p.p.m. and 4.27 p.p.m. The latter is overlapped by another signal. The quintet at 2.08 p.p.m. is assigned to the internal methylene group. The —$CH_2NF$— signal would be expected to be a pair (splitting 25 to 30 cps.) of triplets (splitting 5 to 10 cps.). One triplet appears at 210 cps. The other is apparently overlapped by the ethyl quartet. If it is assumed that the signal at 245 cps. is the central member of the triplet, the chemical shift for —$CH_2NF$— is 3.79 p.p.m. and the HF coupling is 35 cps.

EXAMPLE XI

Fluorination of diethyl tetramethylenedicarbamate

A suspension of 70 grams (0.3 mole) of diethyl tetramethylenedicarbamate in 650 ml. water was fluorinated at 0 to 5° C. with elementary fluorine (diluted with nitrogen, 1 to 4) until 27 liters of flourine was consumed. The reaction mixture was extracted with five 50-ml. portions of methylene chloride and the combined extracts were dried, deacidified with solid sodium bicarbonate, filtered, and concentrated. The residual liquid was fractionated to give 16.0 grams of a colorless liquid, B.P. 50 to 51° C./26 mm. The material was found to be 70 to 75 percent pure, 1,4-bis(difluoamino)butane; an analytical sample was separated by gas chromatography.

*Analysis.*—Calc'd for $C_4H_8N_2F_4$: C, 30.0; H, 5.0; N, 17.5; F, 47.5. Found: C, 30.5; H, 5.0; N, 17.6; F, 44.3. The infrared spectrum of the material is very similar to those of the lower μ, ω-bis(difluoramino)alkane homologues, with the exception of an absorption peak in the carbonyl region (5.8μ), suggesting the presence of a small amount of a foreign material.

EXAMPLE XII

Preparation of 3-nitraza-1,5-bis(difluoroamino)pentane

A suspension of 45 grams (0.15 mole) of diethyl 3-nitraza-1,5-pentanedicarbamate in 650 ml. water was fluorinated at 0 to 5° C. with elementary fluorine (diluted with nitrogen 1 to 4) until 0.6 mole of fluorine was consumed. At the end of the fluorination, the reaction mixture was extracted with five 60-ml. portions of methylene chloride, and the combined extracts were dried with Drierite. The infrared spectrum of the solution showed the presence of large amounts of starting material. The methylene chloride solution was concentrated to remove the solvent and the yellow viscous residue was extracted with five 50-ml. portions of carbon tetrachloride. The solid material insoluble in carbon tetrachloride amounted to 25 grams and was shown to be somewhat impure starting material. The combined carbon tetrachloride extracts were concentrated to remove the solvent. The residual viscous liquid amounted to 11 grams. One half of this material, 5.5 grams, was subjected to vacuum distillation to give 3.0 grams of a pale-yellow liquid, B.P. 70 to 90° C./0.2 mm., $n_D^{25}$ 1.4345. The dark, viscous, distillation residue did not distill at 145° C. at 0.2 mm. The material boiling at 70 to 90° C./0.2 mm. underwent a partial decomposition during distillation. The material was dissolved in 15 ml. methylene chloride. The resulting solution was dried with Drierite, and at the end of the drying period (20 minutes) the solution was deacidified by addition of 3 grams of sodium bicarbonate. The mixture was filtered, and the filtrate concentrated to remove methylene chloride, the residual liquid was purified by distillation to give 2.2 grams of a pale-yellow liquid, B.P. 70 to 71° C./0.1 mm., $n_D^{25}$ 1.4340.

*Analysis.*—Calc'd for $NO_2N(CH_2CH_2NF_2)_2$, $C_4H_8F_4N_4O_2$

C, 21.82; H, 3.66; N, 25.45; F, 34.52. Found: C, 21.5; H, 3.7; N, 24.9; F, 35.0. The infrared spectrum is consistent with the structure.

EXAMPLE XIII

Preparation of methyl N-fluoro-N-(2,2-dinitro-2-fluoroethyl)carbamate

A solution (mainly suspension) of 2.8 grams of methyl 2,2-dinitro-2-fluoroethylcarbamate in 350 ml. of water was fluorinated at 0 to 5° C. until 1.0 liter of fluorine was passed into the reaction mixture. The solution was extracted with three 80-ml. portions of methylene chloride; the combined extracts were dried, filtered, and concentrated. The residual liquid was distilled to give 1.0 gram of a colorless liquid, B.P. 59 to 61° C./0.1 mm., $n_D^{24}$ 1.4285, that was identified as $FC(NO_2)_2CH_2NFCO_2CH_3$. From the distillation residue 1.0 gram of starting material was recovered.

*Analysis.*—Calc'd for $C_4H_5N_3F_2O_6$: C, 20.97; H, 2.20; N, 18.34; F, 16.59. Found: C, 21.2; H, 2.3; N, 18.0; F, 16.8. The infrared spectrum of the compound is shown in FIGURE 13.

The 60-mc. proton and 56.4-mc. fluorine NMR spectra were obtained using a $CCl_4$ solution with TMS and $CFCl_3$ as internal references. The proton NMR spectrum consists of an intense singlet at 3.94 p.p.m. assigned to the ester methyl group, $-CO_2CH_3$. The doublet of doublets at 5.05 p.p.m. is assigned to the methylene group, $FC(NO_2)_2CH_2NF-$. The form of the signal is the result of coupling to the $-NF-$ fluorine (J=30.0 cps.) and the $FC(NO_2)_2-$ fluorine (J=15.5 cps.). The relatively weak signal at 3.68 p.p.m. is unassignable on the basis of the suggested structure and is presumably an impurity.

The fluorine NMR spectrum consists of a triplet (splitting 30.2 cps.) of doublets (splitting 10.2 cps.) at +58.14 p.p.m., assigned to the $-NF-$ fluorine. The signal is split into a triplet by coupling to the methylene protons, 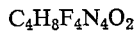, and again into doublets by coupling to the $FC(NO_2)_2-$ fluorine. The origin of the doublt splitting was confirmed by a decoupling experiment involving the signal at +108.5 p.p.m. that is assigned to the $FC(NO_2)_2-$ fluorine. The weak, broadened signal at +109.7 p.p.m. is unassignable on the basis of the structure and is apparently due to an impurity. The proton and fluorine spectra are otherwise entirely consistent with each other, and with the structure,

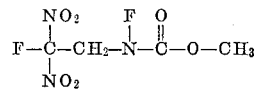

EXAMPLE XIV

Preparation of 1,3-bis(difluoramino)propane

A solution of 19 grams (0.1 mole) of dimethyl trimethylenedicarbamate in 350 ml. of water was fluorinated at 0 to 5° C. until nine liters of fluorine was consumed (1 hour, 15 minutes). At the end of the run the reaction mixture containing 3 to 5 ml. of pale-yellow liquid was extracted with four 25-ml. portions of methylene chloride. The combined methylene chloride extracts were dried, deacidified with solid sodium bicarbonate, filtered, and concentrated at 15 to 18° C./25 mm. to remove methylene chloride. The residual liquid was fractionated to give:

2.8 grams of liquid, B.P. 26 to 43° C./25 mm;
7.2 grams of liquid, B.P. 40 to 48° C./0.1 mm;
1.0 gram of liquid, B.P. 55 to 75° C./0.1 mm;
Distillation residue, 1.9 grams, discarded.

The material of the fourth fraction was analyzed by gas chromatography and contained 78 percent of 1,3-bis(difluoramino)propane, equivalent to 15 percent yield. The compound was contaminated with five impurities ranging from 3 to 8.5 percent.

The higher boiling products were not identified, but on the basis of their boiling points, the material or fraction 2 is probably mainly $NF_2CH_2CH_2CH_2NFCOOCH_3$, and that of fraction 3, $CH_2(CH_2NFCOOCH_3)_2$.

Identical results were obtained when the fluorination was repeated using 0.2 mole of the starting material.

A solution of 26 grams (0.2 mole) of N,N'-diformyl-1,3-diaminopropane in 350 ml. of water was fluorinated at 0 to 5° C. until 18 liters of fluorine was consumed. At the end of the run the reaction mixture was extracted with four 20-ml. portions of methylene chloride, the combined extracts dried, deacidified, filtered and worked up to give 2.5 grams of a colorless liquid, B.P. 26 to 30° C./25 mm., which contained 55 percent of 1,3-bis-(difluoramino)propane (5 percent yield) as determined by gas chromatography.

EXAMPLE XV

Preparation of 1-difluoramino-1-(N-fluoro-N-carbethoxyamino) butane

A solution (partially a suspension) of 5.4 grams of n-$C_3H_7CH(NFCOOEt)_2$ (0.02 mole) in 350 ml. of water was fluorinated at 0 to 5° C. with elementary fluorine (diluted with four-fold nitrogen) until approximately 1.5 liters of fluorine gas was consumed. The aqueous mixture was extracted with six 20-ml. portions of methylene chloride, the combined extracts were dried with Drierite and were filtered, and the filtrate was distilled to remove the solvent. The residual liquid was fractionated at 40 to 70° C./20 to 25 mm. to give 0.7 gram of a colorless liquid ($n_D^{25}$ 1.4018), and 1.0 gram of a colorless liquid (B.P. 100 to 110° C./0.1 to 0.3 mm., $n_D^{25}$ 1.4222) was then distilled. The structure of the high-boiling material has not been established. The lower-boiling product ($n_D^{25}$ 1.4018) was found to be $C_3H_7CH(NF_2)NFCOOC_2H_5$.

*Analysis.*—Calc'd for $C_3H_{12}F_3N_2O_2$: C, 39.25; H, 6.12; F, 26.61; N, 13.1. Found: C, 40.0; H, 6.1; F, 25.6; N, 12.1.

The infrared spectrum, proton-NMR spectrum, and $F^{19}$-NMR spectrum are consistent with the above structure. The proton-NMR spectrum was obtained in carbon tetrachloride solution, with TMS as an internal reference. The triplet and quartet of the ester ethyl group appear at 8.60 and 5.60 ($\tau$ values), respectively. The triplet is superimposed on a more complicated multiplet that may be assigned to the $CH_3CH_2CH_2$ group. A broad, weak signal appears to the low-field side of the quartet. When this signal is examined at a higher radio-frequency level and with an increased sweep speed, it is seen to be a complicated but rather symmetrical multiplet. Although the individual absorptions cannot be assigned in detail, the form of the signal is approximately what would be expected for —$CH_2\underline{CH}NF_2(NF$—$)$. The $\underline{CH}$ signal would be split into a triplet by the adjacent $CH_2$ (expected splitting, 5 to 10 cps.). These signals would themselves be split into a triplet by the $NF_2$ group (expected splitting about 30 cps.). The spectrum therefore supports the proposed structure, but not as clearly as might be desired.

The $F^{19}$-NMR spectrum was obtained in carbon tetrachloride solution, with added Freon-11 as an internal reference. Two signals were observed, the one at —34.0 p.p.m. being about twice the intensity of the one at +89.2 p.p.m. The signal at —34.0 p.p.m. consists of two close-lying doublets. It is assigned to the —NF group by virtue of the chemical shift. The interpretation of the splitting is not obvious; the splitting may be the result of coupling to the adjacent CH and the more distant —N$\underline{F}$COOEt. The signal at +89.2 p.p.m. consists of two close-lying triplets. It may be assigned to N$\underline{F}$COOEt by virtue of the chemical shift. The splitting may be the result of coupling to $\underline{CH}$ and $NF_2$. The chemical shifts and intensity ratios are consistent with the structure.

The novel N-fluorocarbamate and organic difluoramino compounds of this invention contain a plurality of energetic N-F bonds, and are thus inherently useful as explosives. In addition, the novel compounds of this invention find application as high energy components in rocket fuel formulations. Thus, for example, the compounds prepared in accordance with this invention are useful as oxidizers, plasticizers and monomers, in the preparation of rocket propellants.

The higher molecular weight compounds of this invention are suitable as plasticizers for nitrocellulose and nitro polymers such as the nitro-substituted polyurethanes disclosed in assignee's co-pending U.S. patent application Ser. No. 728,491, filed Apr. 14, 1958. The novel compounds of this invention are also useful in the preparation of many other organic compounds.

It will be understood that various modifications may be made in this invention without departing from the spirit thereof or the scope of the appended claims.

I claim:

1. Compounds of the formula:

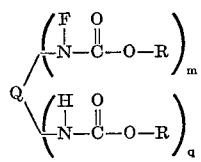

wherein in the above formula, Q is an organic radical selected from the group consisting of alkyl, cycloalkyl, aryl, aralkyl, alkaryl, nitroaryl, nitroalkyl, haloaryl, haloalkyl, alkylene, arylene, haloarylene, nitroarylene, nitroalkylene, and nitraza-interrupted alkylene; having a valency numerically equal to the sum of *m* and *q*; R is a monovalent hydrocarbyl radical, and *m* and *q* are each integers of from 1 to about 5.

2. The compound methyl $\beta$-difluoramino propionate.

3. The method of preparing compounds of the formula:

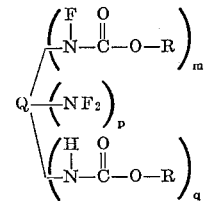

which comprises reacting a compound of the formula:

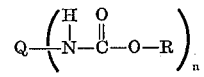

with fluorine; wherein in the above formulae, Q is an organic radical selected from the group consisting of alkyl, cycloalkyl, aryl, aralkyl, alkaryl, nitroaryl, nitroalkyl, haloaryl, haloalkyl, alkylene, arylene, haloarylene, nitroarylene, nitroalkylene, and nitraza-interrupted alkylene; having a valency numerically equal to the sum of *m*, *p* and *q*; R is a monovalent hydrocarbyl radical; *n* is an integer numerically equal to the sum of *n*, *p* and *q*; and *m*, *p* and *q* each have a value of from 0 to about 5; with the proviso that when *m* is 0, *p* is at least 1, and when *p* is 0, *m* is at least 1; and *n* is numerically equal to the sum of *m*, *p* and *q*, and with the further proviso that any —$NF_2$ substituent is attached to a carbon atom in the Q radical and no single carbon atom in the Q radical carries more than one said —$NF_2$ substituent.

4. The method of preparing compounds of the formula:

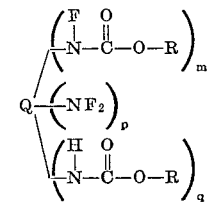

which comprises reacting a compound of the formula:

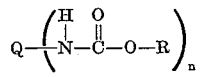

with fluorine in the presence of a substantially inert moderator; wherein in the above formulae, Q is an organic radical selected from the group consisting of alkyl, cycloalkyl, aryl, aralkyl, alkaryl, nitroaryl, nitroalkyl, haloaryl, haloalkyl, alkylene, arylene, haloarylene, nitroarylene, nitroalkylene, and nitraza-interrupted alkylene; having a valency numerically equal to the sum of *m*, *p* and *q*; R is a monovalent hydrocarbyl radical, *n* is an integer numerically equal to the sum of *m*, *p* and *q*; and *m*, *p* and *q* each have a value of from 0 to about 5, with the proviso that when *m* is 0, *p* is at least 1, and when *p* is 0, *m* is at least 1, and with the further proviso that any —$NF_2$ substituent is attached to a carbon atom in the Q radical and no single carbon atom in the Q radical carries more than one said —$NF_2$ substituent.

5. The method of preparing compounds of the formula:

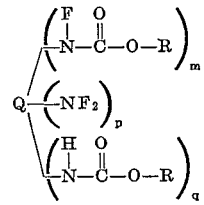

which comprises reacting a compound of the formula:

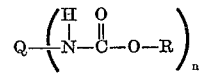

with fluorine in the presence of an aliphatic nitrile moderator; wherein in the above formulae, Q is an organic radical selected from the group consisting of alkyl, cycloalkyl, aryl, aralkyl, alkaryl, nitroaryl, nitroalkyl, haloaryl, haloalkyl, alkylene, arylene, haloarylene, nitroarylene, nitroalkylene, and nitraza-interrupted alkylene; having a valency numerically equal to the sum of $m$, $p$ and $q$; R is a monovalent hydrocarbyl radical; $n$ is an integer numerically equal to the sum of $m$, $p$ and $q$; and $m$, $p$ and $q$ each have a value of from 0 to about 5, with the proviso that when $m$ is 0, $p$ is at least 1, and when $p$ is 0, $m$ is at least 1, and with the further proviso that any —$NF_2$ substituent is attached to a carbon atom in the Q radical and no single carbon atom in the Q radical carries more than one said —$NF_2$ substituent.

6. The method of preparing compounds of the formula:

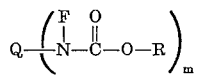

which comprises reacting a compound of the formula:

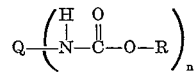

with fluorine in the presence of an aliphatic nitrile moderator; wherein in the above formulae, Q is an organic radical selected from the group consisting of alkyl, cycloalkyl, aryl, aralkyl, alkaryl, nitroaryl, nitroalkyl, haloaryl, haloalkyl, alkyene, arylene, haloarylene, nitroarylene, nitroalkylene, and nitraza-interrupted alkylene; having a valency numerically equal to $m$, R is a monovalent hydrocarbyl radical, $m$ is an integer from 1 to about 5, and $n$ is numerically equal to $m$.

7. The method of preparing compounds of the formula:

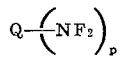

which comprises reacting a compound of the formula:

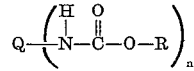

with fluorine in the presence of an aliphatic nitrile moderator; wherein in the above formulae, Q is an organic radical selected from the group consisting of alkyl, cycloalkyl, aryl, aralkyl, alkaryl, nitroaryl, nitroalkyl, haloaryl, haloalkyl, alkylene, arylene, haloarylene, nitroarylene, nitroalkylene, and nitraza-interrupted alkylene; having a valency numerically equal to $p$, R is a monovalent hydrocarbyl radical, $n$ is numerically equal to $p$, and $p$ is an integer from 1 to about 5; and with the proviso that each —$NF_2$ substituent is attached to a carbon atom in the Q radical and no single carbon atom in the Q radical carries more than one said —$NF_2$ substituent.

8. The method of preparing compounds of the formula:

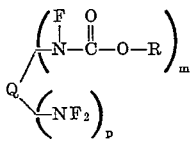

which comprises reacting with fluorine a compound of the formula:

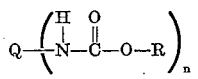

in the presence of a substantially inert moderator, wherein in the above formula, Q is an organic radical selected from the group consisting of alkyl, cycloalkyl, aryl, aralkyl, alkaryl, nitroaryl, nitroalkyl, haloaryl, haloalkyl, alkylene, arylene, haloarylene, nitroarylene, nitroalkylene, and nitraza-interrupted alkylene; having a valency numerically equal to the sum of $m$ and $p$, R is a monovalent hydrocarbyl, $n$ is an integer numerically equal to the sum of $m$ and $p$, and $m$ and $p$ are each integers of from 1 to about 5; and with the proviso that each —$NF_2$ substituent is attached to a carbon atom in the Q radical and no single carbon atom in the Q radical carries more than one said —$NF_2$ substituent.

9. The method of preparing compounds of the formula:

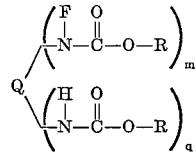

which comprises reacting with fluorine a compound of the formula:

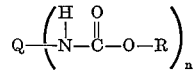

in the presence of a substantially inert moderator, wherein in the above formulae, Q is an organic radical selected from the group consisting of alkyl, cycloalkyl, aryl, aralkyl, alkaryl, nitroaryl, nitroalkyl, haloaryl, haoalkyl, akylene, arylene, haloarylene, nitroarylene, nitroalkylene, and nitraza-interrupted alkylene; having a valency numerically equal to the sum of $m$ and $q$, R is a monovalent hydrocarbyl radical, $n$ is numerically equal to the sum of $m$ and $q$, and $m$ and $q$ are each integers of from 1 to about 5.

10. The method of preparing ethyl N-fluoro-N-methylcarbamate which comprises reacting fluorine with ethyl N-methylcarbamate in the presence of a substantially inert moderator, and recovering the product thus produced.

11. The method of preparing ethyl N-fluoro-N-octylcarbamate which comprises reacting fluorine with ethyl N-octylcarbamate in the presence of a substantially inert moderator, and recovering the product thus produced.

12. The method of preparing butyl N-fluoro-N-methylcarbamate which comprises reacting fluorine with butyl N-methylcarbamate in the presence of a substantially inert moderator, and recovering the product thus produced.

13. The compound ethyl N-cyclohexyl-N-fluorocarbamate.

References Cited

UNITED STATES PATENTS

| | | | |
|---|---|---|---|
| 3,375,259 | 3/1968 | Gibson et al. | 260—309.7 |
| 3,359,318 | 12/1967 | Sharts | 260—563 |
| 3,347,925 | 10/1967 | Tyler | 260—583 |
| 3,103,456 | 9/1963 | Lawton et al. | 60—35.4 |
| 3,149,165 | 9/1964 | Sausen | 149—36 |
| 3,166,595 | 1/1965 | Frazer | 260—583 |

OTHER REFERENCES

Gervasi et al., J. Am. Chem. Soc., vol. 78, pp. 1679 to 1682 (1956).

Lawton et al., J. Am. Chem. Soc, vol 81, p. 4755, (1959).

Hoffman et al., Chem. Reviews, vol. 62, p. 15 (1962).

LORRAINE A. WEINBERGER, Primary Examiner

PAUL J. KILLOS, Assistant Examiner

U.S. Cl. X.R.

260—471, 482, 583, 563, 578